No. 729,235. PATENTED MAY 26, 1903.
C. P. STEINMETZ.
SYSTEM OF ELECTRICAL DISTRIBUTION.
APPLICATION FILED JAN. 2, 1901.
NO MODEL.
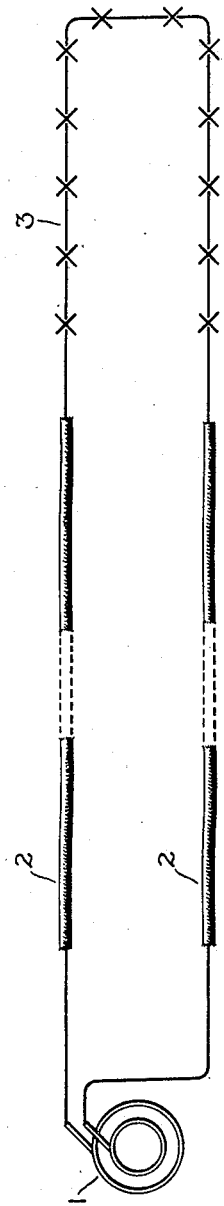
Witnesses
John Ellis Glenn
Benjamin R. Hull
Inventor:
Charles P. Steinmetz,
by Albert G. Davis
Atty.

No. 729,235. Patented May 26, 1903.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 729,235, dated May 26, 1903.

Application filed January 2, 1901. Serial No. 41,811. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, of which the following is a specification.

In electrical transmission-lines containing distributed capacity—such, for example, as underground or submarine cables—the effect of an electromotive force impressed upon the transmitting end of the line is not felt immediately throughout the line. On the contrary, when current commences to flow into the transmitting end of the line it first charges that end of the line and then proceeds toward more and more distant portions of the line, charging each portion of the same as it proceeds, the propagation of current taking the form of a wave which traverses the transmission-line from end to end.

If the electromotive force impressed upon the transmitting end of the line is alternating, then there will be a succession of waves following each other through the line, and if the line be long enough or, which is the same thing, its distributed capacity be sufficient there may be one or more complete waves of current in the transmission-line at any instant. Such being the case, it is evident that the electromotive force and current due thereto differ in phase and magnitude from point to point along the length of the transmission-line. If, for example, the constants of the line be such that when the electromotive force is at a maximum at the transmitting end of the line there occurs a point on the transmission-line at which the electromotive force at the same instant is zero, then the electromotive forces at this point and at the transmitting end of the line are in quadrature relation to each other. If this point mentioned is the first one at which the zero electromotive force occurs and if this point happens to be located at the receiving end of the line, then the line itself may be considered as corresponding to a quarter-wave length of the current supplied.

I have discovered that if a line which possesses inductance as well as distributed capacity in such magnitudes as to correspond thus to a quarter-wave length has impressed thereon at the transmitting end of the line an electromotive force of constant difference of potential, then the electromotive force at the receiving end of the line will be in quadrature with that impressed upon the line and will vary with the load upon the receiving-circuit in such a manner as to maintain a constant value of current therein. It is obvious, of course, that this arrangement may be reversed, one end of the line being supplied with a constant current, the other end of the line then delivering a current at constant potential.

The drawing illustrates my invention in a general way, but cannot, of course, be made to represent the relations between the various constants of the line on which depend the operativeness of my invention.

Generally speaking, however, the invention comprises a source of alternating electromotive force 1, preferably of constant potential, either single phase or multiphase, as may be desired. In the drawing, however, a single-phase source only is shown, this source being operatively connected in any suitable manner to a transmission-line 2, possessing inductance and distributed capacity, this line being made up, for example, of underground cable of suitable length. The receiving end of the line is shown as consisting of a series circuit 3, including translating devices, such as arc-lamps or the like, this circuit being connected in operative relation to the transmission-lines 2, which constitute the medium for transferring energy between the constant-potential source 1 and the constant-current consumption or receiving circuit 3.

If the resistance of the transmission line may be neglected in comparison with the capacity and inductance of the same, then the relation between the capacity and inductance necessary to produce a quarter-wave length between the transmitting and receiving ends of the line may be represented by the equation $LC = 1/(16 N^2)$, where L represents the coefficient of self-induction, C the capacity, and N the frequency or number of waves per second of the impressed electromotive force of the generating source. As these are dependent variables, the transmission-lines may be designed in a large number of different ways, all of which may satisfy the above equation. No hard and fast rule can therefore be given as to the precise amount of capacity or of inductance in the transmission-line, these qualities being dependent on the frequency of the generating source, as will be evident. It is obvious, therefore, that my invention may assume various forms without departing from the spirit thereof, for which reason I desire my claims to be given a reasonably liberal construction.

What I claim as new, and desire to secure by Letters Patent of the United States, is—

1. The combination of a constant-potential circuit, a constant-current circuit, and a current-carrying medium electrically connecting said circuits in series, said medium having its electrical constants so proportioned as to automatically transform current of the character flowing in one of said circuits into current of the character flowing in the other.

2. The combination of a constant-potential circuit, a constant-current circuit, and a current-carrying medium connecting said circuits, said medium possessing distributed capacity and inductance in such magnitudes as to produce a quadrature relation between the electromotive forces in said circuits.

3. The combination of a constant-potential circuit, a constant-current circuit, and a cable or cables having distributed capacity and connecting said circuits, said cable or cables being proportioned so as to cause an automatic transformation of current of the character flowing in one of said circuits into current of the character flowing in the other.

4. The combination of a source of alternating current, a line connected thereto and possessing inductance and distributed capacity in such magnitude as to produce a quadrature relation between the electromotive forces at the beginning and end of the line respectively, and a consumption-circuit connected to the end of said line.

5. The combination of a source of alternating current, a cable connected to the terminals of the source and possessing such electrical constants as to cause a phase displacement of ninety degrees between the electromotive forces at the beginning and end of the cable respectively, and a constant-current circuit connected to the end of the cable.

6. The combination of a source of alternating current, cables operatively connected to the terminals of said source, and to a constant-current circuit, said cables possessing capacity and inductance in such relative magnitude as to produce a quadrature relation between the electromotive force impressed upon the cable and that impressed upon the constant-current circuit.

7. The combination of a constant-potential circuit, a constant-current circuit, and a cable or cables connecting said circuits, said cable or cables being of negligible resistance and possessing distributed capacity and self-induction in the magnitudes expressed by the equation $LC = 1/(16 N^2)$ where L and C represent respectively the self-induction and capacity and N the frequency.

8. The combination of a source of alternating current, a consumption-circuit, and a cable or cables operatively connected to said consumption-circuit and to said source, said cable or cables possessing distributed capacity in such magnitude relatively to self-induction of the system as to produce a constant current in said consumption-circuit when the electromotive force of said source is constant.

In witness whereof I have hereunto set my hand this 29th day of December, 1900.

CHARLES P. STEINMETZ.

Witnesses:
BENJAMIN B. HULL,
MARGARET E. WOOLLEY.